US012753898B2

(12) United States Patent

Chen et al.

(10) Patent No.: US 12,753,898 B2
(45) Date of Patent: Oct. 6, 2026

(54) DECORATIVE ASSEMBLY AND VEHICLE

(71) Applicant: Iris Optronics Co., Ltd., Tainan City (TW)

(72) Inventors: Chih Wei Chen, Hsinchu County (TW); Chi Chang Liao, Tainan City (TW)

(73) Assignee: Iris Optronics Co., Ltd., Tainan City (TW)

( * ) Notice: Subject to any disclaimer, the term of this patent is extended or adjusted under 35 U.S.C. 154(b) by 0 days.

(21) Appl. No.: 19/218,630

(22) Filed: May 27, 2025

(65) Prior Publication Data

US 2025/0362000 A1 Nov. 27, 2025

Related U.S. Application Data

(60) Provisional application No. 63/652,064, filed on May 27, 2024.

(51) Int. Cl.

| | |
|---|---|
| ***F21S 41/00*** | (2018.01) |
| ***B60Q 1/00*** | (2006.01) |
| ***B60Q 1/50*** | (2006.01) |
| ***F21S 41/64*** | (2018.01) |
| ***F21S 43/00*** | (2018.01) |
| *F21W 104/00* | (2018.01) |

(52) U.S. Cl.

CPC .......... *F21S 41/645* (2018.01); *B60Q 1/0023* (2013.01); *B60Q 1/50* (2013.01); *F21S 43/601* (2024.05); *F21W 2104/00* (2018.01)

(58) Field of Classification Search

CPC .... F21S 43/601; F21S 41/645; B60Q 1/0023; B60Q 1/50

See application file for complete search history.

(56) References Cited

U.S. PATENT DOCUMENTS

| | | | | |
|---|---|---|---|---|
| 6,580,472 | B1 * | 6/2003 | Willingham | B60J 3/04 359/275 |
| 8,995,039 | B2 * | 3/2015 | Bartug | C03C 17/3639 359/247 |
| 9,333,728 | B2 * | 5/2016 | Veerasamy | C03C 17/3644 |
| 2012/0307337 | A1 | 12/2012 | Bartug et al. | |
| 2022/0350185 | A1 | 11/2022 | Gim et al. | |
| 2022/0355730 | A1 * | 11/2022 | Singh | B60Q 1/5037 |
| 2023/0152654 | A1 * | 5/2023 | Klawuhn | E06B 3/6722 359/275 |
| 2023/0273492 | A1 * | 8/2023 | Yu | F21S 43/14 349/115 |

FOREIGN PATENT DOCUMENTS

| | | |
|---|---|---|
| TW | 202223509 A | 6/2022 |

* cited by examiner

*Primary Examiner* — Gerald J Sufleta, II

(74) *Attorney, Agent, or Firm* — CKC & Partners Co., LLC

(57) ABSTRACT

A decorative assembly includes a main board structure and a liquid crystal panel. The main board structure is transparent and includes a first main board surface and a second main board surface. The liquid crystal panel includes a first liquid crystal surface and a second liquid crystal surface, and the first liquid crystal surface is connected to at least one portion of the second main board surface. The liquid crystal panel is in a flat plate shape or only bends along a first direction.

12 Claims, 7 Drawing Sheets

DECORATIVE ASSEMBLY AND VEHICLE

RELATED APPLICATIONS

This application claims priority to U.S. Provisional Application Ser. No. 63/652,064, filed May 27, 2024, which is herein incorporated by reference.

BACKGROUND

Technical Field

The present disclosure relates to a decorative assembly and a vehicle. More particularly, the present disclosure relates to a decorative assembly which includes a liquid crystal panel and a vehicle which includes the aforementioned decorative assembly.

Description of Related Art

With the development of the technology, the proportion of electronic products in vehicles continues to increase. In addition to the function of the vehicles, the exterior design of the vehicles is also valued. However, the vehicles and exterior parts thereof, such as front headlights, turn signals, brake lights and windows, should be met the traffic regulations before the vehicle style is designed. Therefore, designing the vehicles and the exterior parts thereof, which are met the traffic regulations and have the recognition and the aesthetic, has become a tough goal.

Therefore, a vehicle and exterior parts or a decorative assembly thereof, which can enhance the recognition and the aesthetic, reduce the cost and lower the designing complexity and manufacturing difficulty, need to be developed.

SUMMARY

According to an embodiment of the present disclosure, a decorative assembly includes a main board structure and a liquid crystal panel. The main board structure is transparent and includes a first main board surface and a second main board surface, wherein the first main board surface and the second main board surface are relatively disposed. The liquid crystal panel includes a first liquid crystal surface and a second liquid crystal surface, wherein the first liquid crystal surface and the second liquid crystal surface are relatively disposed, and the first liquid crystal surface is connected to at least one portion of the second main board surface. The decorative assembly has a main board side and a liquid crystal side, the first main board surface faces towards the main board side, the second liquid crystal surface faces towards the liquid crystal side, and the liquid crystal panel is in a flat plate shape or only bends along a first direction.

According to another embodiment of the present disclosure, a vehicle has an outer side, and includes a main board structure and a liquid crystal panel. The main board structure is transparent and includes a first main board surface and a second main board surface, wherein the first main board surface and the second main board surface are relatively disposed, and the first main board surface faces towards and is exposed to the outer side of the vehicle. The liquid crystal panel includes a first liquid crystal surface and a second liquid crystal surface, wherein the first liquid crystal surface and the second liquid crystal surface are relatively disposed, and the first liquid crystal surface is connected to at least one portion of the second main board surface. The liquid crystal panel is in a flat plate shape or only bends along a first direction.

DETAILED DESCRIPTION

Figure 1A:
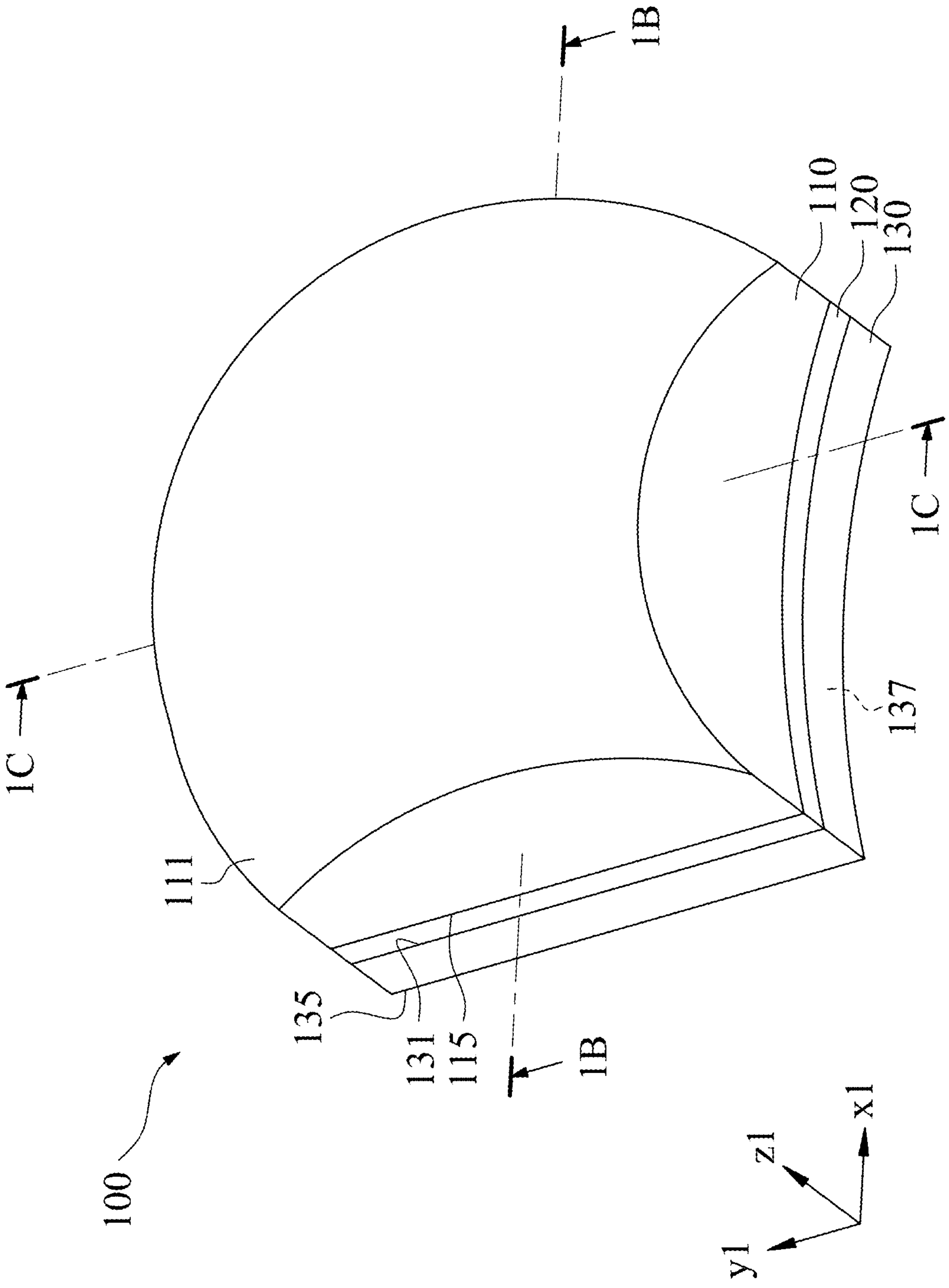
FIG. 1A is a partial three-dimensional view of a decorative assembly according to the 1st example of the present disclosure.

Embodiments of the present disclosure will be described below with reference to the drawings. For the sake of clarity, many practical details will be explained together in the following statements. However, it should be understood that these practical details should not be used to limit the present disclosure. That is, these practical details are not necessary in embodiments of the present disclosure. In addition, for the sake of simplifying the drawings, some commonly used structures and components are shown in the drawings in a simple schematic manner; and repeated components may be represented by the same numbers.

In addition, the terms first, second, etc. are used herein to describe various elements or components, these elements or components should not be limited by these terms. Consequently, a first element or component discussed below could be termed a second element or component. Moreover, the combination of components in the present disclosure is not a combination that is generally known, conventional or customary in this field. The components themselves being or being not common knowledge cannot be used to determine whether the combination relationship can be easily completed by a person skilled in the technical field.

FIG. 1A is a partial three-dimensional view of a decorative assembly 100 according to the 1st example of the present disclosure. In FIG. 1A, the decorative assembly 100 includes a main board structure 110 and a liquid crystal panel 130, and FIG. 1A only illustrates partial of the decorative assembly 100.

Figure 1B:
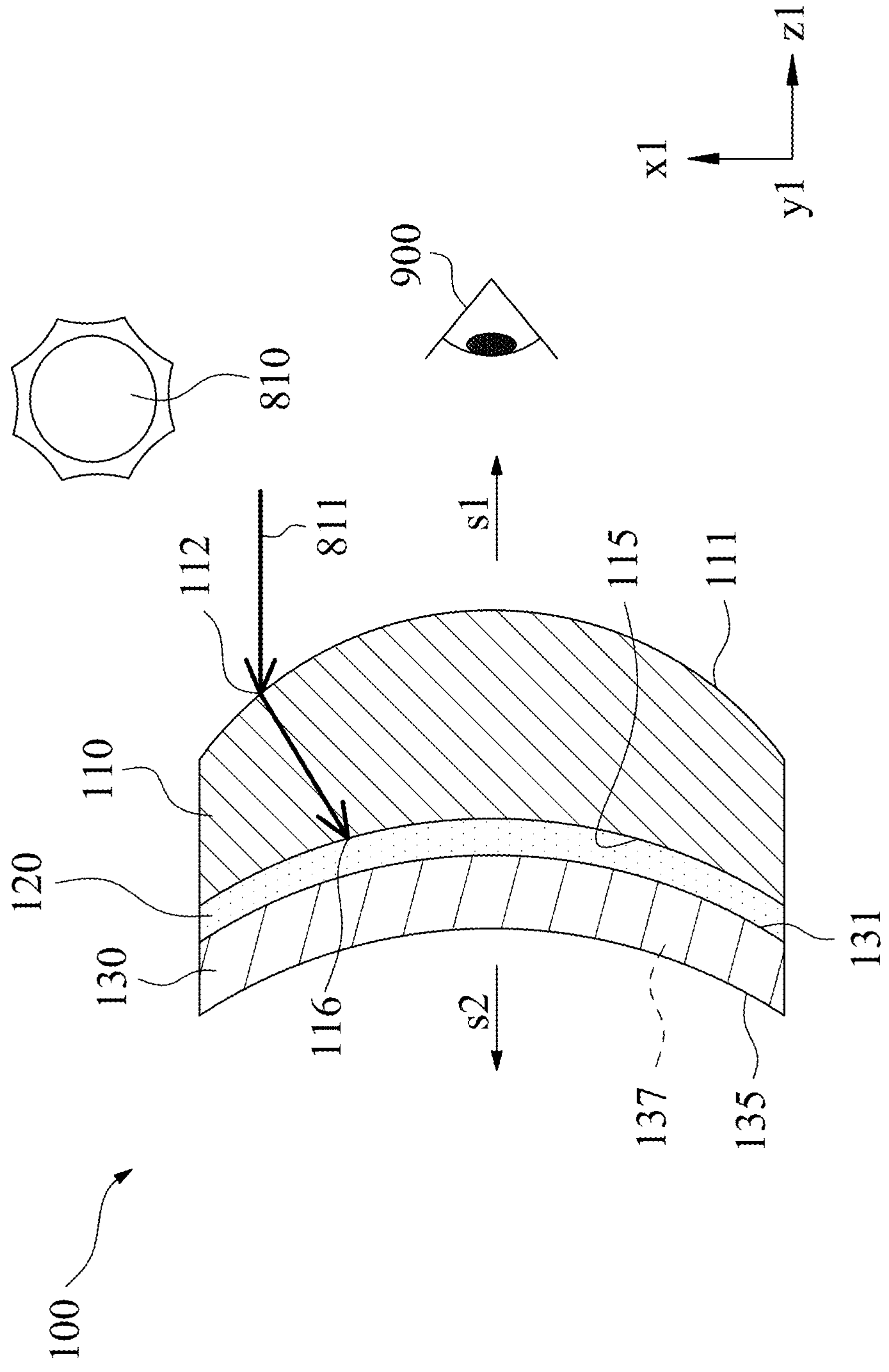
FIG. 1B is a cross-sectional view along a 1B-1B line in FIG. 1A.
Figure 1C:
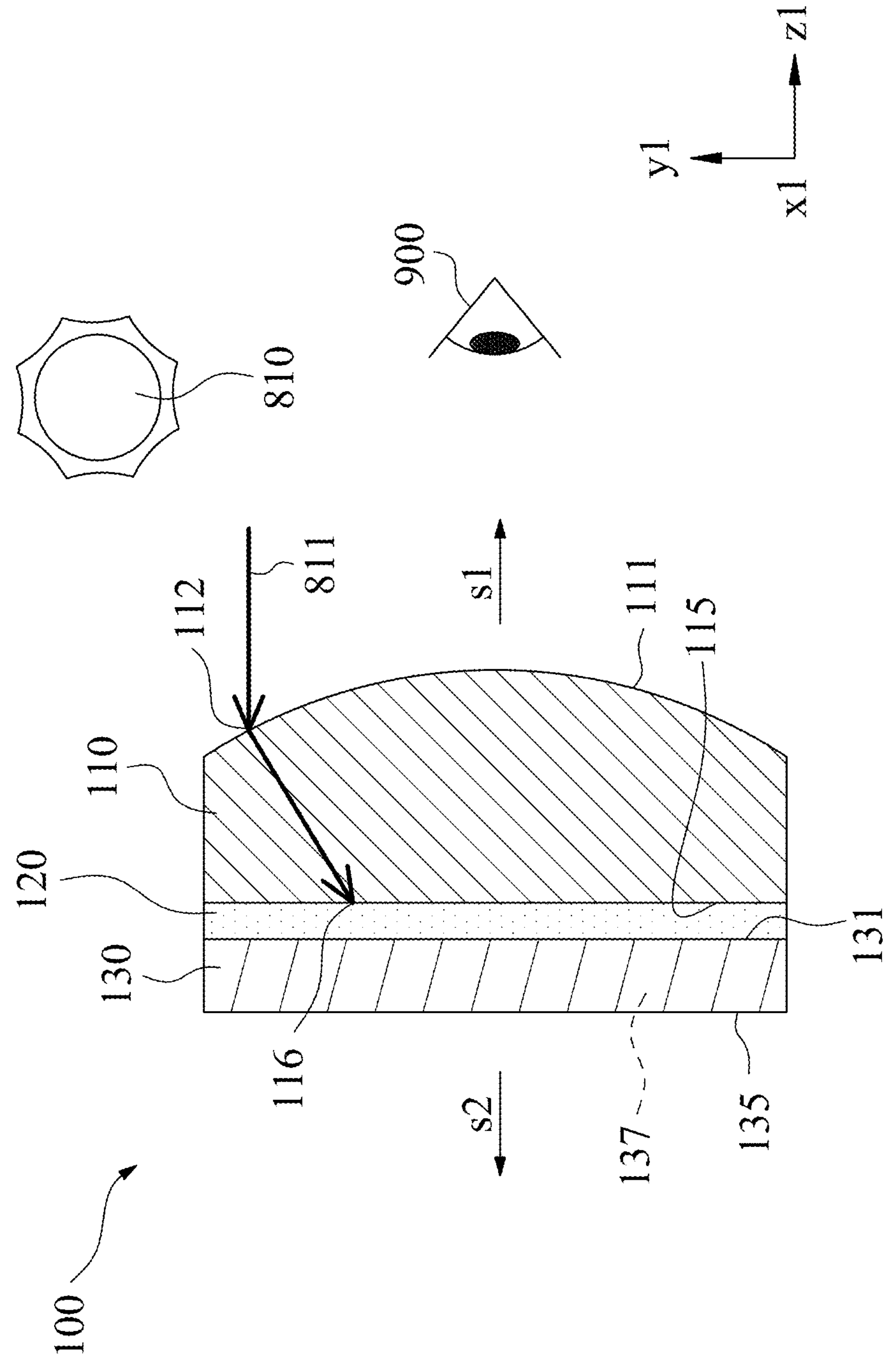
FIG. 1C is a cross-sectional view along a 1C-1C line in FIG. 1A.

FIG. 1B is a cross-sectional view along a 1B-1B line in FIG. 1A, and FIG. 1C is a cross-sectional view along a 1C-1C line in FIG. 1A. In FIGS. 1B and 1C, the main board structure 110 is transparent and includes a first main board surface 111 and a second main board surface 115, wherein the first main board surface 111 and the second main board surface 115 are relatively disposed. The liquid crystal panel 130 includes a first liquid crystal surface 131 and a second liquid crystal surface 135, wherein the first liquid crystal surface 131 and the second liquid crystal surface 135 are relatively disposed, and the first liquid crystal surface 131 is connected to at least one portion of the second main board surface 115.

In FIGS. 1A to 1C, the decorative assembly 100 has a main board side s1 and a liquid crystal side s2, the first main board surface 111 faces towards the main board side s1, the second liquid crystal surface 135 faces towards the liquid crystal side s2, and the liquid crystal panel 130 is in a flat plate shape or only bends along a first direction x1. Therefore, the manufacturing yield rate and the reliability of the decorative assembly 100 can be enhanced, and a liquid crystal pattern 137 of the liquid crystal panel 130 can simultaneously obtain the undistorted effect.

In particular, the liquid crystal panel 130 of the decorative assembly 100 according to the 1st example only bends along the first direction x1 rather than a second direction y1 and a third direction z1, wherein the first direction x1, the second direction y1 and the third direction z1 are vertical to each other. It should be mentioned that the positions of the aforementioned first direction x1, the second direction y1 and the third direction z1 on the liquid crystal panel 130 based on the curved shape of the liquid crystal panel 130 are different. For example, the first direction x1, the second direction y1 and the third direction z1 labelled in FIGS. 1A to 1C are based on a central point of the first liquid crystal surface 131 and a central point of the second liquid crystal surface 135.

In detail, the liquid crystal panel 130 can be a cholesterol liquid crystal display. Therefore, the cholesterol liquid crystal display both obtains two characteristics of transparent/transmissive and reflective so as to be favorable for applying to the decorative assembly 100 or the exterior parts, such as the automotive exterior parts, so that the aesthetic, the fashion and the personal style can be enhanced.

The decorative assembly 100 can further include an optical clear adhesive (OCA) 120, and the first liquid crystal surface 131 is indirectly connected to the at least one portion of the second main board surface 115 via the optical clear adhesive 120. Therefore, the liquid crystal panel 130 and the main board structure 110 are directly bonded via the optical clear adhesive 120 so as to optimize the optical quality of the decorative assembly 100.

In FIGS. 1B and 1C, when the liquid crystal panel 130 is switched to a pattern mode (that is, a reflection mode) and a first light 811 of a first light source 810 is configured to enter the decorative assembly 100 from the first main board surface 111, the liquid crystal pattern 137 (not shown) of the liquid crystal panel 130 is observed by an observer 900 located on the main board side s1. Therefore, the first light source 810 can be an ambient light, and the decorative assembly 100 is switched to the pattern/reflection mode to reflect and display the liquid crystal pattern 137 which is specific via the liquid crystal panel 130.

The first light 811 of the first light source 810 passes through a first corresponding point 112 of the first main board surface 111 and a second corresponding point 116 of the second main board surface 115 in sequence, and a curvature radius of the first corresponding point 112 and a curvature radius of the second corresponding point 116 can be different. Therefore, the decorative assembly 100 can include the main board structure 110 which is non-planar. For example, the main board structure 110 is a vehicle lamp housing (lampshade), which is mostly a non-planar structure. Further, the liquid crystal panel 130 is a curved surface (flexible), and the optical design of the structure of the vehicle lamp housing can be considered, so that an image observed via the observer 900 can be corrected. According to other examples (not shown) of the present disclosure, the liquid crystal panel and the second main board surface of the main board structure bend along the first direction, the first main board surface of the main board structure bends along the second direction, and the image along the second direction is corrected by the optical design of the main board structure. When the ambient light enters from the main board structure to the decorative assembly, the ambient light is optically refracted twice via the main board structure and the liquid crystal panel, so that the liquid crystal pattern shows the special effect via the observer.

The curvature radius of the second corresponding point 116 can be larger than the curvature radius of the first corresponding point 112 (as shown in FIGS. 1B and 1C), wherein the curvature radius of the second corresponding point 116 of the second main board surface 115 is approximately equal to a curvature radius of a corresponding point (not shown) of the first liquid crystal surface 131 of the liquid crystal panel 130 and a curvature radius of a corresponding point (not shown) of the second liquid crystal surface 135 of the liquid crystal panel 130. Therefore, when the main board structure 110 is the vehicle lamp housing, since the lamp housing is mostly designed in a shell shape, the vehicle aesthetic and the hydromechanics of an outer side of the lamp housing is considered, and an inner side of the lamp housing is designed with the optical reflection path and the optical refraction path of the car light so as to achieve the effect of the optical refracting effect of the inner side of the lamp housing. In general, only the optical path of the car light from the inner side to the outer side needs to be considered. When the liquid crystal panel 130 is switched to the pattern mode and two lights (not shown) of the first light source 810 are configured to enter the decorative assembly 100 from the first main board surface 111, the first liquid crystal surface 131, which the two lights is incident, is a convex surface and configured to reflect the two lights to the outer side of the vehicle, and the effect of slightly magnifying the image can be maintained by changing the structure and the thickness of the lamp housing, so that the cost of the lamp housing can be reduced, and the liquid crystal pattern 137 observed via the observer 900 can obtain the magnifying effect.

Figure 3:
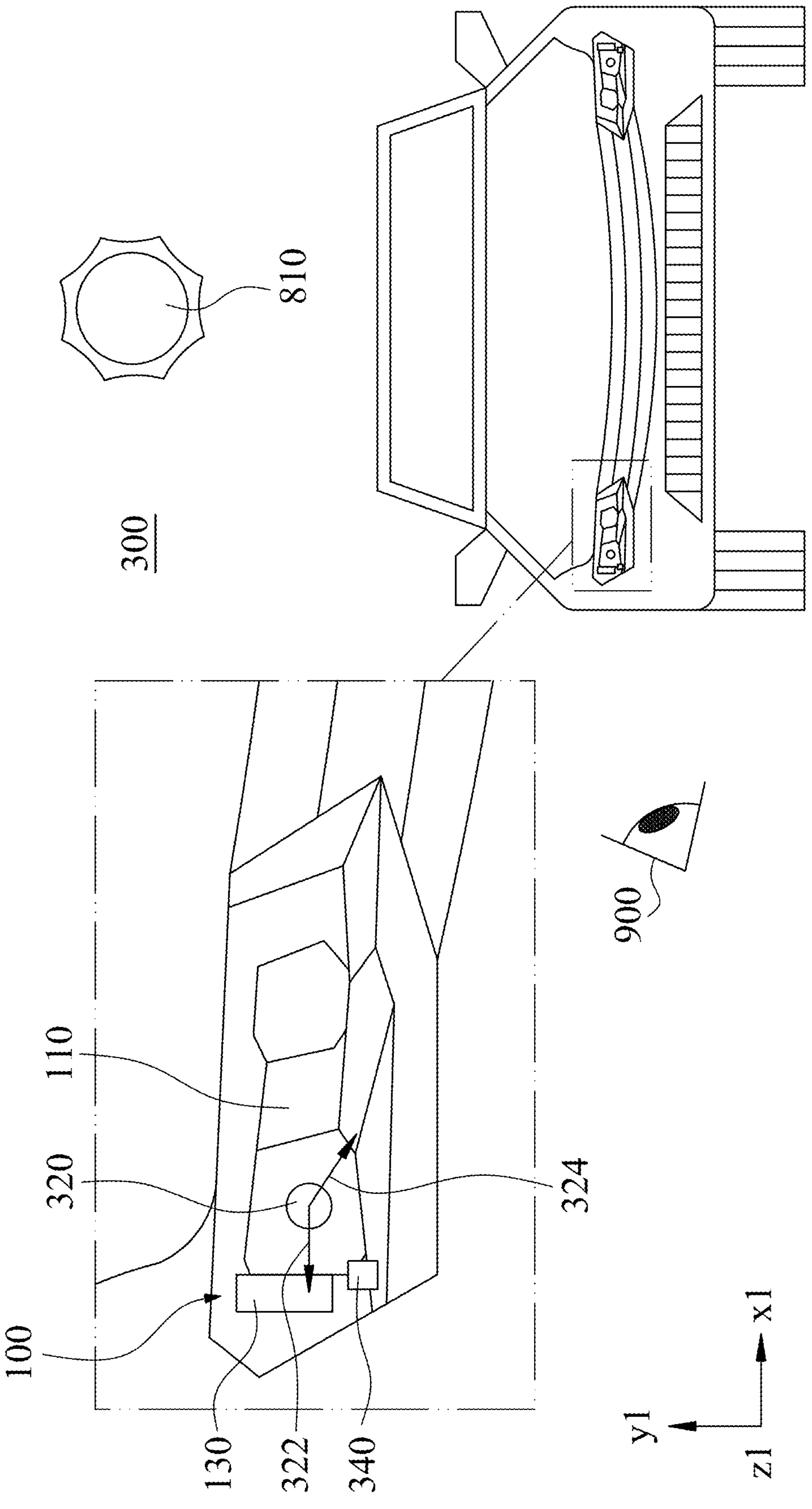
FIG. 3 is a schematic view of a vehicle according to the 3rd example of the present disclosure.

When the liquid crystal panel 130 is switched to a transparent mode and a second light of a second light source (such as the second light 322 of the second light source 320 in FIG. 3) is configured to enter the decorative assembly 100 from the second liquid crystal surface 135, the second light source is observed by the observer 900 located on the main board side s1. Therefore, the liquid crystal panel 130 can selectively show the transmittance state so as to expand the application situation of the liquid crystal panel 130.

When the liquid crystal panel 130 is switched to the transparent mode, a light transmittance of the liquid crystal panel 130 can be larger than or equal to 50%. Therefore, the decorative assembly 100 can be sufficiently transmitted via the second light source so as to satisfy the application requirement of the liquid crystal panel 130 switched to the transparent mode. For example, when the main board structure 110 is the vehicle lamp housing, the liquid crystal panel 130, which is under the transparent mode, is favorable for maintaining the driving lighting function and complying with the regulations.

The liquid crystal panel 130 can include two transparent substrates (not shown) facing towards the main board side s1 and the liquid crystal side s2, respectively. That is, the liquid crystal panel 130 does not have a black base plate. Therefore, the transmittance effect of the decorative assembly 100 and the liquid crystal panel 130 thereof can be achieved. The aforementioned transparent substrates can be made of glass, PET, PI (but the present disclosure is not limited thereto) and obtain the flexible characteristics.

The second main board surface 115, the first liquid crystal surface 131 and the second liquid crystal surface 135 can be parallel to each other and not parallel to the first main board surface 111. Therefore, the curved shape of the first liquid crystal surface 131 and the curved shape of the first main board surface 111 can be matched by bonding the second main board surface 115 and the first liquid crystal surface 131, so that the display quality of the liquid crystal pattern 137 can be enhanced.

The main board structure 110 can have an uneven thickness. For example, a central area of the main board structure 110 is thicker than an upper area and a lower area of the main board structure 110 in FIGS. 1B and 1C, and the present disclosure is not limited thereto. Therefore, the image correction can be performed by the optical design (structural design) of the main board structure 110 so as to ensure the liquid crystal pattern 137 observed via the observer 900 to be undistorted.

Figure 2A:
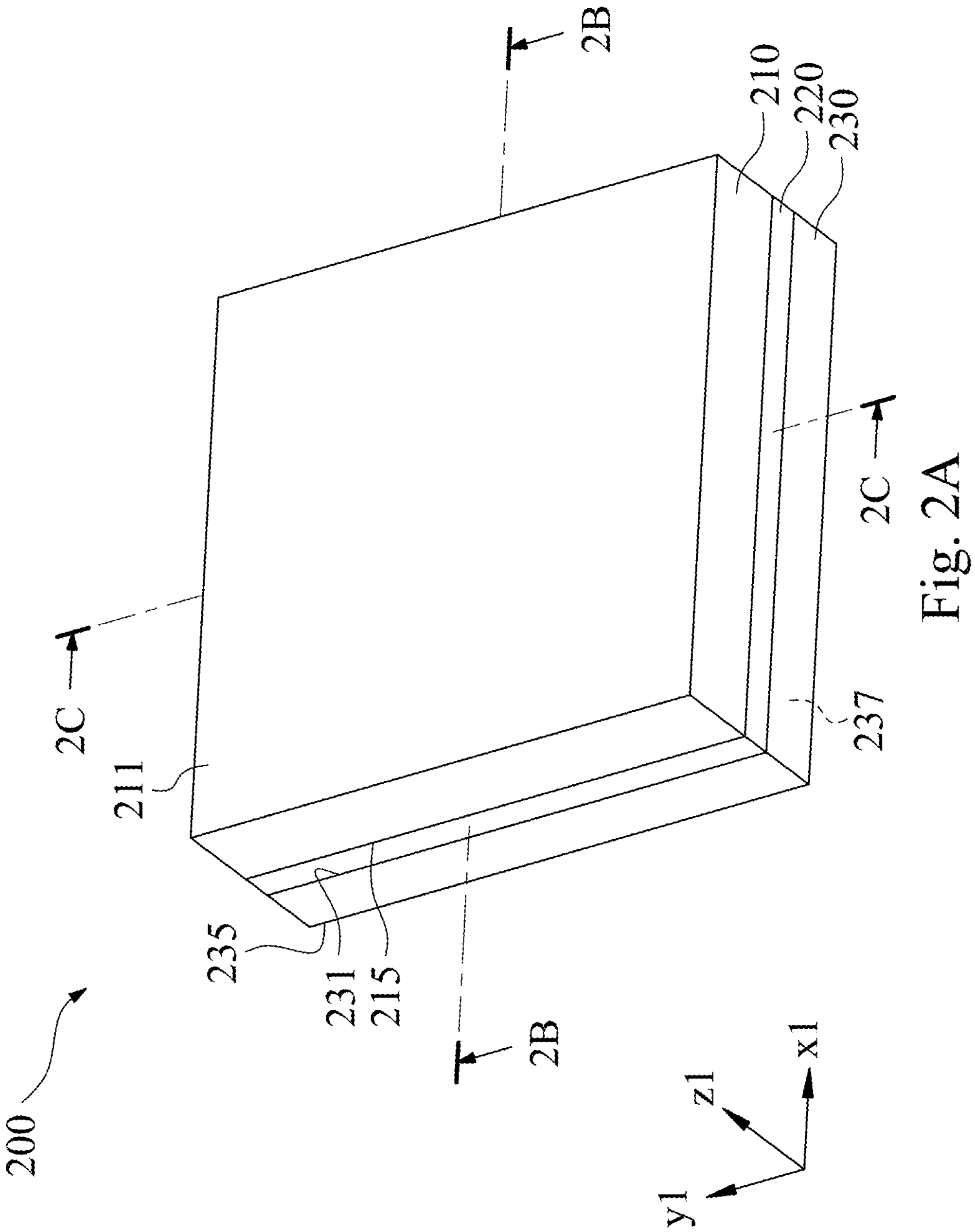
FIG. 2A is a partial three-dimensional view of a decorative assembly according to the 2nd example of the present disclosure.

FIG. 2A is a partial three-dimensional view of a decorative assembly 200 according to the 2nd example of the present disclosure. In FIG. 2A, the decorative assembly 200 includes a main board structure 210 and a liquid crystal panel 230, and FIG. 2A only illustrates partial of the decorative assembly 200.

Figure 2B:
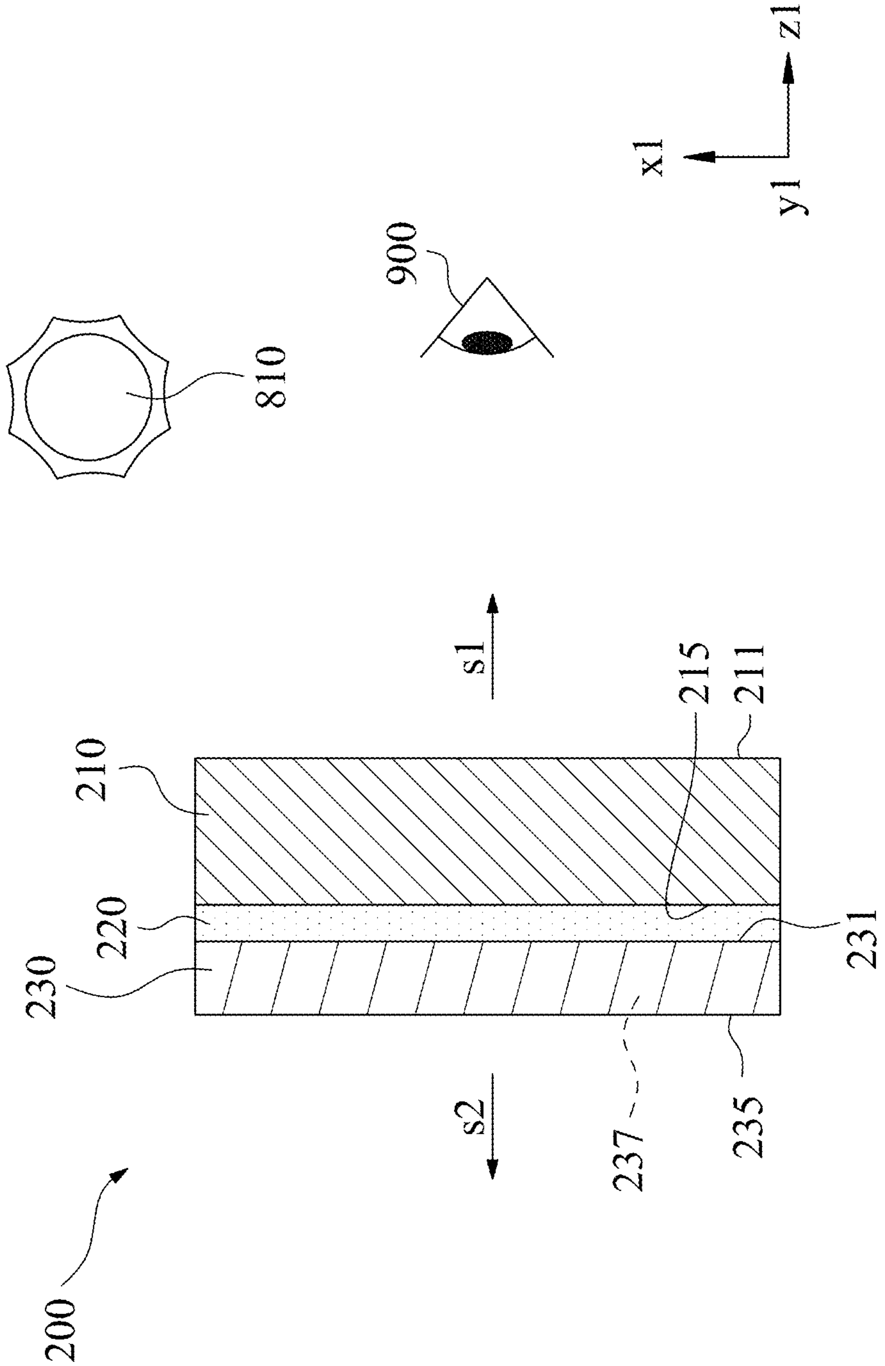
FIG. 2B is a cross-sectional view along a 2B-2B line in FIG. 2A.
Figure 2C:
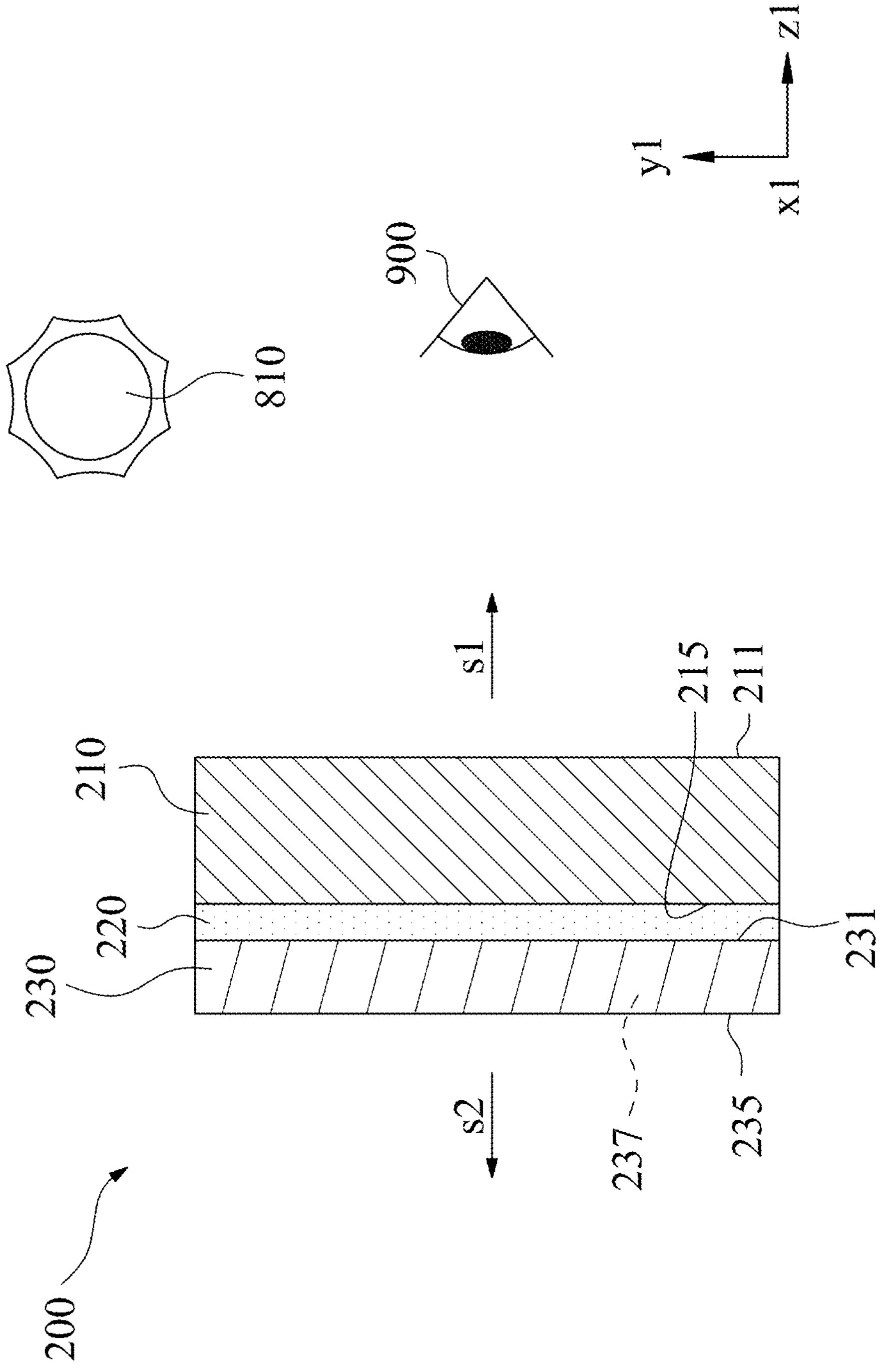
FIG. 2C is a cross-sectional view along a 2C-2C line in FIG. 2A.

FIG. 2B is a cross-sectional view along a 2B-2B line in FIG. 2A, and FIG. 2C is a cross-sectional view along a 2C-2C line in FIG. 2A. In FIGS. 2B and 2C, the main board structure 210 is transparent and includes a first main board surface 211 and a second main board surface 215, wherein the first main board surface 211 and the second main board surface 215 are relatively disposed. The liquid crystal panel 230 includes a first liquid crystal surface 231 and a second liquid crystal surface 235, wherein the first liquid crystal surface 231 and the second liquid crystal surface 235 are relatively disposed, and the first liquid crystal surface 231 is connected to at least one portion of the second main board surface 215.

In FIGS. 2A to 2C, the decorative assembly 200 has a main board side s1 and a liquid crystal side s2, the first main board surface 211 faces towards the main board side s1, the second liquid crystal surface 235 faces towards the liquid crystal side s2, and the liquid crystal panel 230 is specifically in a flat plate shape.

In detail, the liquid crystal panel 230 is a cholesterol liquid crystal display. The decorative assembly 200 further includes an optical clear adhesive 220, and the first liquid crystal surface 231 is indirectly connected to the at least one portion of the second main board surface 215 via the optical clear adhesive 220.

In FIGS. 2B and 20, when the liquid crystal panel 230 is switched to a pattern mode (that is, a reflection mode) and a first light 811 of a first light source 810 is configured to enter the decorative assembly 200 from the first main board surface 211, a liquid crystal pattern 237 (not shown) of the liquid crystal panel 230 is observed by an observer 900 located on the main board side s1.

When the liquid crystal panel 230 is switched to a transparent mode and a second light of a second light source (such as the second light 322 of the second light source 320 in FIG. 3) is configured to enter the decorative assembly 200 from the second liquid crystal surface 235, the second light source is observed by the observer 900 located on the main board side s1. When the liquid crystal panel 230 is switched to the transparent mode, a light transmittance of the liquid crystal panel 230 is larger than or equal to 50%.

The liquid crystal panel 230 includes two transparent substrates (not shown) facing towards the main board side s1 and the liquid crystal side s2, respectively. The first main board surface 211, the second main board surface 215, the first liquid crystal surface 231 and the second liquid crystal surface 235 are parallel to each other.

FIG. 3 is a schematic view of a vehicle 300 according to the 3rd example of the present disclosure. In FIGS. 1A to 1C and 3, the vehicle 300 has an outer side, and includes a main board structure 110 and a liquid crystal panel 130. That is, the vehicle 300 includes the decorative assembly of the present disclosure, such as the decorative assembly 100 according to the 1st example, but the present disclosure is not limited thereto. The main board structure 110 is transparent and includes a first main board surface 111 and a second main board surface 115, wherein the first main board surface 111 and the second main board surface 115 are relatively disposed, and the first main board surface 111 faces towards and is exposed to the outer side of the vehicle 300, that is the main board side s1 of the decorative assembly 100. The liquid crystal panel 130 includes a first liquid crystal surface 131 and a second liquid crystal surface 135, wherein the first liquid crystal surface 131 and the second liquid crystal surface 135 are relatively disposed, and the first liquid crystal surface 131 is connected to at least one portion of the second main board surface 115. The liquid crystal panel 130 is in a flat plate shape or only bends along a first direction x1. Therefore, the manufacturing yield rate, the reliability and the undistorted effect of the liquid crystal panel 130 bonded to the main board structure 110 can be enhanced, and the recognition and the aesthetic of the vehicle 300 can be improved. In particular, the liquid crystal panel 130 according to the 3rd example only bends along the first direction x1.

In detail, when the vehicle 300 is in a specific state, the liquid crystal panel 130 is switched to a pattern mode. When the liquid crystal panel 130 is switched to the pattern mode and a first light 811 of a first light source 810 is configured to enter the main board structure 110 and the liquid crystal panel 130 from the outer side in sequence, a liquid crystal pattern 137 of the liquid crystal panel 130 is observed by an observer 900 located on the outer side. Therefore, the first light source 810 can be the ambient light, and the vehicle 300 is switched to the pattern/reflection mode to reflect and display the liquid crystal pattern 137 which is specific via the liquid crystal panel 130.

The specific state can be before turning off a power source of the vehicle 300, while stopping the vehicle 300 or while the liquid crystal panel 130 unnecessary to provide a light penetration characteristic. Therefore, the liquid crystal panel 130 can be configured to maintain to display the corresponding liquid crystal pattern 137 at the specific state by setting the arrangement of the liquid crystal molecular of the liquid crystal panel 130 while the specific state. For example, the cholesterol liquid crystal only consumes the power while changing the liquid crystal pattern 137, and hence the liquid crystal pattern 137 which is preset can be written in the cholesterol liquid crystal before the vehicle 300 is parked and the main power is stopped. That is, the specific pattern (liquid crystal pattern 137) can be kept when the vehicle is stationary and without power, so that the design of the vehicle can be shown.

The liquid crystal pattern 137 can be at least one of a vehicle brand, a vehicle model, a license plate, a driver identity, an advertisement and a traffic safety reminder message. Therefore, the liquid crystal pattern 137 can be designed according to the owner's favorite, and the liquid crystal pattern 137 can be displayed according to the specific state of the vehicle 300, so that the recognition of the vehicle 300 can be enhanced.

The vehicle 300 can further include a temperature sensor 340 adjacent to the liquid crystal panel 130 and configured to provide a sensing temperature. When the sensing temperature is higher than a conversion temperature of the liquid crystal panel 130 and then lower than the conversion temperature of the liquid crystal panel 130, the liquid crystal panel 130 is configured to resend a pattern signal corresponding to the liquid crystal pattern 137, wherein the sensing temperature of the liquid crystal panel 130 higher than the conversion temperature can be a homeotropic mode. Moreover, when the sensing temperature is higher than the conversion temperature of the liquid crystal panel 130 and then lower than a setting temperature (such as 70 degrees Celsius) of the liquid crystal panel 130, the liquid crystal panel 130 is configured to resend the pattern signal corresponding to the liquid crystal pattern 137, wherein the setting temperature is lower than the conversion temperature. Therefore, the automobile temperature test is usually higher than 100 degrees Celsius, and the liquid crystal of the liquid crystal panel 130 also reaches the conversion temperature and cannot be configured to show a planar mode and a focal-conic mode. That is, the screen of the liquid crystal panel 130 is abnormal. Hence, when the temperature sensor 340 disposed on a periphery of the liquid crystal panel 130 (such as the inner side of the lamp housing) is configured to sense the temperature dropping to the normal working range of the setting temperature, the pattern signal corresponding to the liquid crystal pattern 137 is resent so as to show the liquid crystal pattern 137.

The main board structure 110 can be a car body, a lamp housing or a window glass. Therefore, the vehicle specific information can be displayed on the vehicle 300 by the reflecting characteristic of the liquid crystal panel 130, or the reflecting characteristic can be switched to the transmittance characteristic to comply with the driving safety regulation.

The main board structure 110 can be a lamp housing, and the vehicle 300 can further include a second light source 320 being a lamp and located on an inner side of the main board structure 110 and the liquid crystal panel 130, that is the liquid crystal side s2 of the decorative assembly 100. When the vehicle 300 is moving, the liquid crystal panel 130 is switched to a transparent mode. When the liquid crystal panel 130 is switched to the transparent mode and a second light 322 of the second light source 320 enters the liquid crystal panel 130 and the main board structure 110 in sequence, the second light source 320 is observed by an observer 900 located on the outer side. Therefore, the liquid crystal panel 130 can be in the transparent mode. That is, the liquid crystal panel 130 is in the transmittance state, so that the vehicle light can be complied with the requirement of the traffic regulation. According to other examples (not shown) of the present disclosure, the main board structure can be the window glass to display the vehicle specific information by the reflecting characteristic of the liquid crystal panel, or the reflecting characteristic can be switched to the transmittance characteristic to comply with the driving safety regulation.

A ratio of an area of the first liquid crystal surface 131 to an area of the second main board surface 115 can be less than 0.5, and the second light 322 is not located on a central main light path 324 of the second light source 320. Therefore, when the main board structure 110 is the lamp housing of the vehicle 300, the vehicle 300 can be complied with the safety regulation, and the loss of the brightness of the vehicle light can be avoided so as to avoid indirect influencing the driving safety. For example, before the vehicle 300 starts to move, such as the main power is started, the specific pattern (liquid crystal pattern 137) retained by the cholesteric liquid crystal at rest is switched to the transparent mode, and the original optical path of the vehicle light is not affected and the lighting effect can be achieved.

Other details of the main board structure 110 and the liquid crystal panel 130 of the decorative assembly 100 according to the 3rd example can be referred to the 1st example, and so are not described herein.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A decorative assembly, comprising:

a main board structure, being transparent and comprising a first main board surface and a second main board surface, wherein the first main board surface and the second main board surface are relatively disposed; and a liquid crystal panel comprising a first liquid crystal surface and a second liquid crystal surface, wherein the first liquid crystal surface and the second liquid crystal surface are relatively disposed, and the first liquid crystal surface is connected to at least one portion of the second main board surface;

wherein the decorative assembly has a main board side and a liquid crystal side, the first main board surface faces towards the main board side, the second liquid crystal surface faces towards the liquid crystal side, and the liquid crystal panel is in a flat plate shape or only bends along a first direction;

wherein the second main board surface, the first liquid crystal surface and the second liquid crystal surface are parallel to each other and not parallel to the first main board surface.

2. The decorative assembly of claim 1, further comprising:

an optical clear adhesive, wherein the first liquid crystal surface is indirectly connected to the at least one portion of the second main board surface via the optical clear adhesive.

3. The decorative assembly of claim 1, wherein when the liquid crystal panel is switched to a pattern mode and a first light of a first light source is configured to enter the decorative assembly from the first main board surface, a liquid crystal pattern of the liquid crystal panel is observed by an observer located on the main board side.

4. The decorative assembly of claim 3, wherein the first light passes through a first corresponding point of the first main board surface and a second corresponding point of the second main board surface in sequence, and a curvature radius of the first corresponding point and a curvature radius of the second corresponding point are different.

5. The decorative assembly of claim 1, wherein when the liquid crystal panel is switched to a transparent mode and a second light of a second light source is configured to enter the decorative assembly from the second liquid crystal surface, the second light source is observed by an observer located on the main board side.

6. The decorative assembly of claim 1, wherein the liquid crystal panel comprises two transparent substrates towards the main board side and the liquid crystal side, respectively.

7. A vehicle, having an outer side, and comprising:

a main board structure, being transparent and comprising a first main board surface and a second main board surface, wherein the first main board surface and the second main board surface are relatively disposed, and the first main board surface faces towards and is exposed to the outer side of the vehicle; and a liquid crystal panel comprising a first liquid crystal surface and a second liquid crystal surface, wherein the first liquid crystal surface and the second liquid crystal surface are relatively disposed, and the first liquid crystal surface is connected to at least one portion of the second main board surface;

wherein the liquid crystal panel is in a flat plate shape or only bends along a first direction;

wherein the second main board surface, the first liquid crystal surface and the second liquid crystal surface are parallel to each other and not parallel to the first main board surface.

8. The vehicle of claim 7, wherein when the vehicle is in a specific state, the liquid crystal panel is switched to a pattern mode;

wherein when the liquid crystal panel is switched to the pattern mode and a first light of a first light source is configured to enter the main board structure and the liquid crystal panel from the outer side in sequence, a liquid crystal pattern of the liquid crystal panel is observed by an observer located on the outer side.

9. The vehicle of claim 8, wherein the specific state is before turning off a power source of the vehicle, while stopping the vehicle or while the liquid crystal panel unnecessary to provide a light penetration characteristic.

10. The vehicle of claim 8, further comprising:

a temperature sensor adjacent to the liquid crystal panel and configured to provide a sensing temperature;

wherein when the sensing temperature is higher than a conversion temperature of the liquid crystal panel and then lower than the conversion temperature of the liquid crystal panel, the liquid crystal panel is configured to resend a pattern signal corresponding to the liquid crystal pattern.

11. The vehicle of claim 7, wherein the main board structure is a lamp housing, and the vehicle further comprises:

a second light source, being a lamp and located on an inner side of the main board structure and the liquid crystal panel;

wherein when the vehicle is moving, the liquid crystal panel is switched to a transparent mode;

wherein when the liquid crystal panel is switched to the transparent mode and a second light of the second light source enters the liquid crystal panel and the main board structure in sequence, the second light source is observed by an observer located on the outer side.

12. The vehicle of claim 11, wherein a ratio of an area of the first liquid crystal surface to an area of the second main board surface is less than 0.5, and the second light is not located on a central main light path of the second light source.

* * * * *